United States Patent

Bellec

[19]

[11] Patent Number: 5,838,746
[45] Date of Patent: Nov. 17, 1998

[54] RADIO COMMUNICATION SYSTEM PERMITTING OF MANAGEMENT OF VARIABLE TRANSMISSION DELAYS

[75] Inventor: Martial Bellec, Pleumeur Bodou, France

[73] Assignee: U.S. Philips Corporation, New York, N.Y.

[21] Appl. No.: 572,217

[22] Filed: Dec. 13, 1995

[30] Foreign Application Priority Data

Dec. 14, 1994 [FR] France ................................ 9415071

[51] Int. Cl.⁶ .................................................. H04L 7/00
[52] U.S. Cl. ........................... 375/365; 375/317; 370/509; 370/514
[58] Field of Search .................... 375/365, 368, 375/317, 319; 370/509, 514

[56] References Cited

U.S. PATENT DOCUMENTS 5,095,493   3/1992   Arthur et al. ........................... 375/200

*Primary Examiner*—Don N. Vo
*Attorney, Agent, or Firm*—Dicran Halajian

[57] ABSTRACT

The invention relates to a radio communication system for enabling radio frames to be transmitted between terminals and radio base stations which are such a distance apart that a transmission delay between the terminals and the stations is smaller than a certain limit. According to the invention, when a radio base station is unlocked, a DC component of a received signal is estimated during a whole interval in which a preamble word may be received. In the locked state, an estimation will take place only during the preamble word.

10 Claims, 4 Drawing Sheets

RADIO COMMUNICATION SYSTEM PERMITTING OF MANAGEMENT OF VARIABLE TRANSMISSION DELAYS

BACKGROUND OF THE INVENTION

1. Field of the Invention

The invention relates to a radio communication system which comprises at least one terminal synchronized with a radio station for transmitting radio frames to the radio station which contain information streams among which notably a preamble word and which arrive at the radio station with a delay that is smaller than a certain limit, said radio station comprising an estimation circuit for estimating the DC component of the received radio frames, which estimation is used as a decision threshold by the radio station to assign a value to the received information streams.

The invention likewise relates to a radio base station which is intended to be used in a radio communication system that comprises at least one terminal synchronized with said radio station for transmitting radio frames to the radio station, said radio frames containing information streams among which notably a preamble word and arriving at said radio station with a variable transmission delay that is smaller than a certain limit, and which comprises an estimation circuit for estimating the DC component of the received radio frames, which estimation is used as a decision threshold for assigning a value to the received information streams.

2. Discussion of the Related Art

The invention has important applications in the field of radio communication, notably for applications in which the radio base stations are to cover a relatively wide geographical area, for example, for applications to cordless subscriber connections to a public telecommunication network, notably for radio communication systems based on the DECT standard. Actually, in this case the typical coverage area of a radio base station is 5 km which may be considered a large range compared with applications with portables within an area, and for which the radio base stations have a maximum range of 200 m.

In the long-range applications, the transmission times may cause a certain return delay in the reception of data and a guard time between the various time slots of the DECT frame is provided for this purpose by the standard (standard ETS 300175-2 and ETS 300175-3). In the case of a delay, the base station runs the risk of being disturbed by the reception of noise or interference due to nearer portable terminals.

More particularly in the case of an incoherent FSK reception, the frequency offset between the carriers respectively transmitted and received by the radio base station and the terminal generates a non-zero DC component in the demodulated baseband data. This DC component, which is used by the radio receiver of the radio base station as a decision threshold for the assignment of a value to received information streams, varies with the frequency offset. It is thus fundamental to obtain a precise estimation thereof for each communication between a radio base station and a terminal. In the case of a delay, such an estimation runs the risk of being degraded by noise and interference signals.

SUMMARY OF THE INVENTION

The goal of the present invention is to provide a solution to this problem in order to realize a radio communication system in which the base stations simultaneously support short and long-range applications.

Therefore, a radio communication system as defined in the opening paragraph is characterized in that the radio station comprises means for determining said delay, and control means for controlling said estimation circuit, so that:

as long as said delay is undetermined, the estimation is made during a time interval of which the boundaries, defined on the basis of said limit, correspond to the minimum and maximum possible receiving instants of the preamble word, when the delay is determined, the estimation is made only during the preamble word.

Thus, when a terminal starts transmitting and when the distance separating the terminal from the radio base station and thus the transmission delay of the frame have not been determined, the estimation is made upon all the information streams received in the time interval that may contain a preamble word. Afterwards, when the delay is known, the estimation is made only upon the preamble word. The DC component of the received signal thus does not run the risk of being extracted from a noise of interference signal. Moreover, the obtained estimation is stopped at the end of the preamble word so as to avoid any deviation of the estimation in the case where a long fixed sequence of data would be transmitted.

In an advantageous embodiment of the invention, each radio frame additionally contains a synchronization word, the detection by the radio station of which notably makes it possible to determine said delay, and the radio station comprises control means for controlling a synchronization word detection circuit, so that:

as long as said delay is undetermined, said detection is activated during a time interval of which the boundaries, defined on the basis of said limit, correspond to the minimum and maximum instants at which said synchronization word can be received, whereas the detection is deactivated once a synchronization word has been detected, when the delay is determined, the detection is activated during a limited time interval around the provided detection position of the synchronization word.

It is thus the detection of a synchronization word in a data frame that makes it possible to determine said delay, so that a greater precision can be obtained because the timing of the received data is thus already determined.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENT

The invention will now be described on the basis of the DECT radio communication system which enables a radio station, called radio base station, to communicate with a plurality of terminals inside a geographical area.

Figure 1:
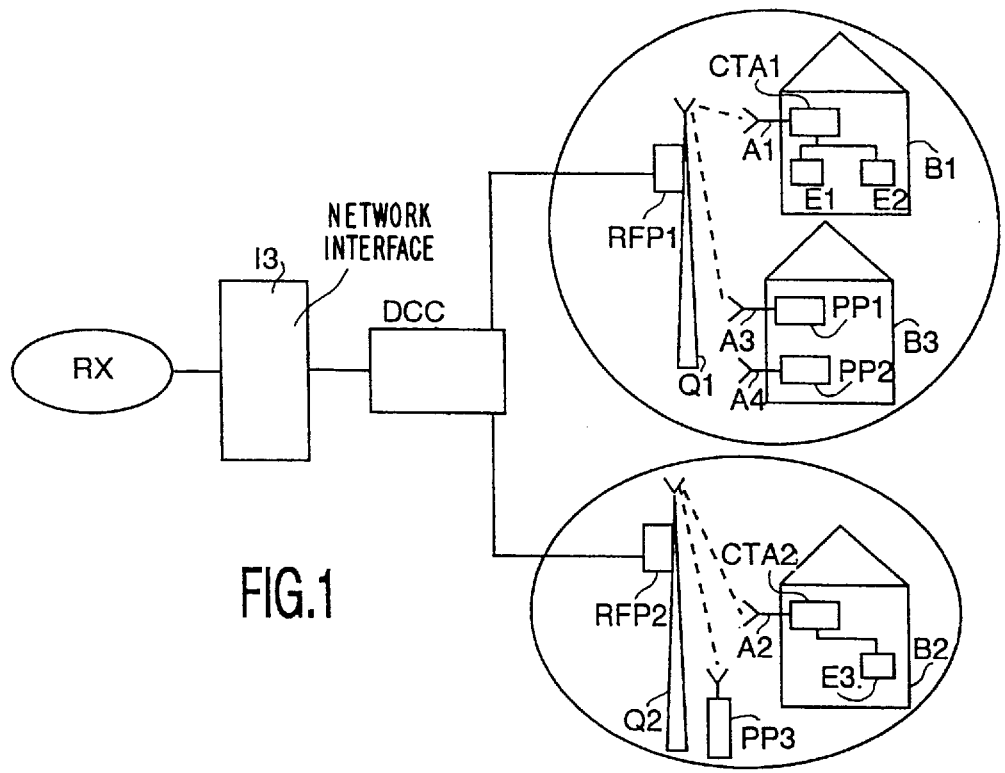
FIG. 1 is a diagram representing a radio communication system according to the invention.

A radio communication system according to the invention is shown in FIG. 1. On the one hand, it comprises two fixed terminals CTA1 and CTA2 installed in two buildings B1 and B2, which have each an aerial A1 and A2 and are connected to speech transmission equipment (telephone or facsimile, for example) E1, E2 and E3, respectively. The terminals PP1 and PP2 are fixed terminals dedicated to the transfer of data, which terminals are installed in a building B3 and have an aerial A3 and A4, respectively. The terminal PP1 supports the RNIS services and the terminal PP2 is an Ethernet adapter intended to be connected to a cordless local area data network of the Ethernet type. Finally, the terminal PP3 is a portable terminal which supports speech services.

On the other hand, a radio communication system according to the invention comprises two radio base stations RFP1 and RFP2 respectively, installed at the top of two pylons Q1 and Q2 and connected to a concentrator DCC. This concentrator DCC is furthermore connected to a network RX via a network interface module 13. This network RX is, for example, a public-switched network for speech transfer applications and a network of the Ethernet type for data transfer applications.

A communication may thus be established between the radio base station RFP1 and the terminals CTA1, PP1 and PP2, on the one hand, and between the radio base station RFP2 and the terminals CTA2 and PP3, on the other hand.

Figure 2:
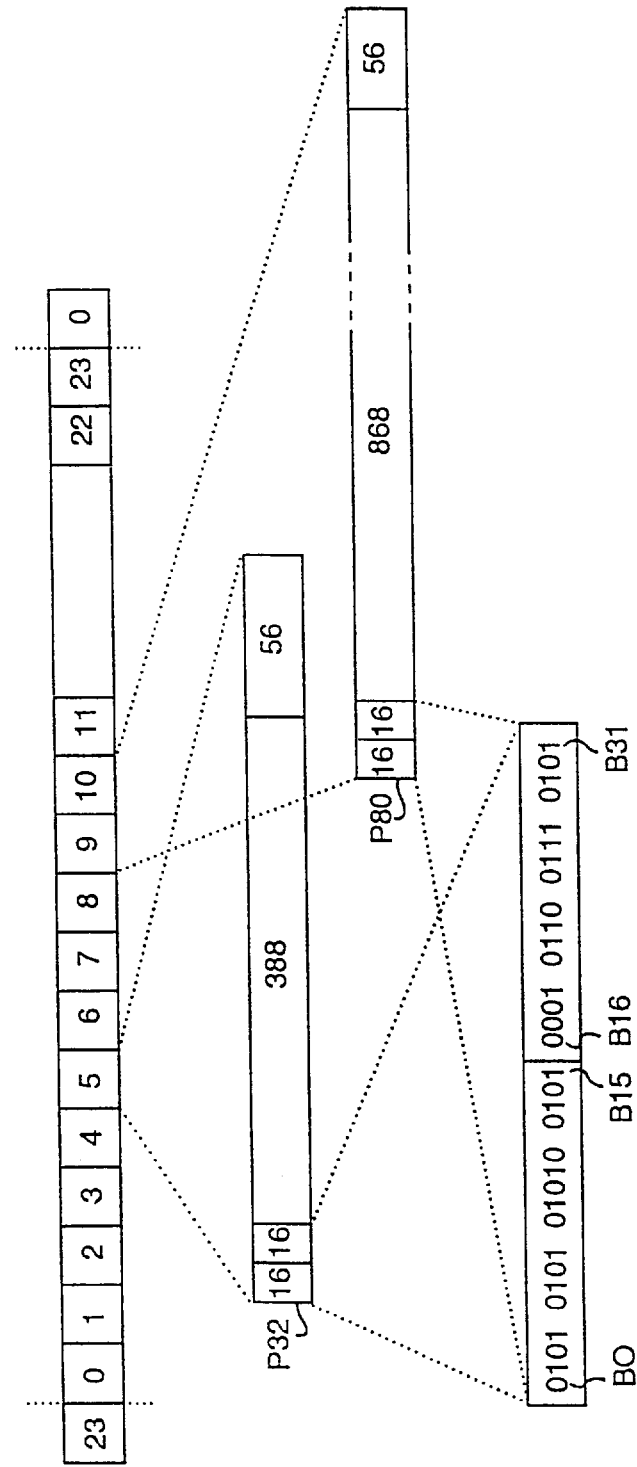
FIG. 2 is a representation of the DECT frame and of its time windows.

The DECT standard, using a TDMA (time-division multiplex access) multi-frequency architecture, each of these communications occupies a time window in the DECT frame. As indicated in FIG. 2, the DECT frame contains 24 time windows which carry each 480 bits. The DECT standard defines two types of packets called P32 and P80 which may be transmitted by a terminal to a radio base station. They contain 424 and 904 bits respectively, so that a time window of the DECT frame contains a packet P32 or a half-packet P80, while a guard interval is provided at the end of each packet to absorb the transmission delays. Each DECT packet comprises a synchronization field S of 32 bits, followed by a data field of 388 bits for P32 packets, and 868 bits for P80 packets, which data field itself is followed by 4 redundancy bits for the protection of these data.

The synchronization field S is comprised of a first 16-bit-long word which forms a preamble word P that permits of recovering the clock rate of the data transmitter, and a second 16-bit-long word which forms a synchronization word SW. According to the DECT standard, in the case of a communication transmitted by a terminal, this field S has the following value:

0101 0101 0101 0101 0001 0110 0111 0101, or in hexadecimal notation:

5555 1675.

A guard interval of 56 bits is thus provided at the end of each packet, so as to permit a certain delay in the transmission of data between the terminal and the radio base station. In practice, this guard interval cannot be used to its maximum and several bits (6 bits in the example which will be described) are to be reserved to prepare the reception of the next time window.

As regards the time base, each terminal is enslaved to the radio base station with which it is communicating, that is to say, it utilizes in the transmission mode a time base which is recovered from the received frames coming from this radio base station. When a terminal is synchronized with a radio base station, it can transmit a call to this station in one of the time windows of the DECT frame. The radio base station permanently scrutinizes the time windows in the receiving mode to detect any synchronization word for the purpose of locking itself on the transmitting terminal.

Figure 3:
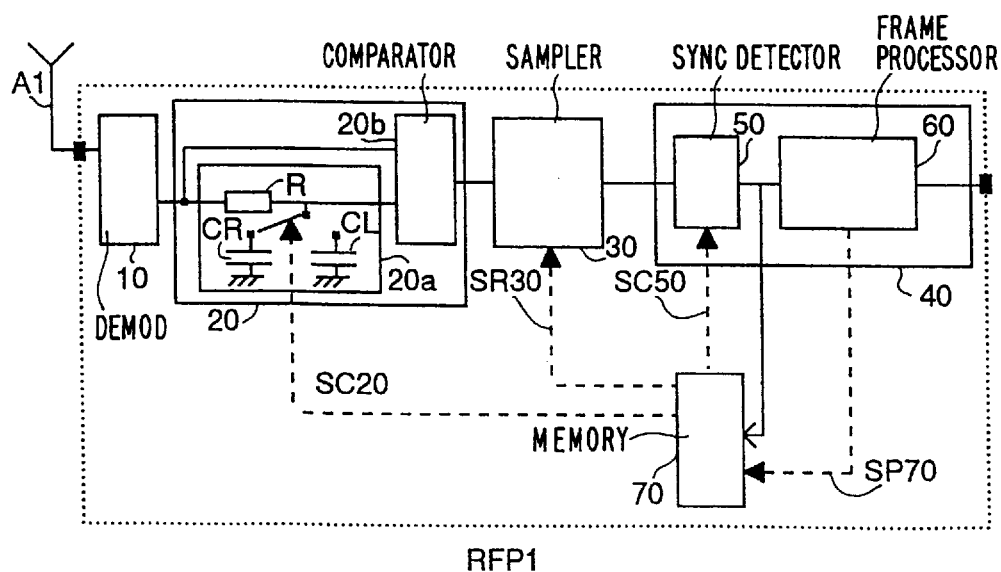
FIG. 3 is a diagrammatic representation of a radio base station according to the invention.

FIG. 3 represents the receiving section of a radio base station RFP1 according to the invention. It comprises a non-coherent FSK radio demodulator 10 connected to an aerial A1 for receiving the radio signals transmitted by the terminals. The demodulated signal coming from this demodulator is transmitted to a decision circuit 20. This circuit 20 comprises an estimation circuit 20a for estimating the DC component of the demodulated signal, and a comparing circuit 20b which compares the demodulated signal with the estimated DC component to make a decision on the received data. The regenerated signal coming from circuit 20b is then transmitted to a sampling and timing recovery unit 30. The sampled data produced on the output of this unit 30 are supplied to a module 40 for processing DECT frames, and notably in a first interval to a circuit 50 for detecting the synchronization word S, after which they are supplied to a circuit 60 for processing the DECT frame proper.

As has been explained, the transmitted bits may be received with a certain delay. The distance between the transmitting terminal and the radio base station being unknown, this delay is not determined a priori. When the radio station is in an unlocked state, the synchronization word must thus be searched within the possible minimum receiving instant of the first bit of the synchronization word SW and the possible maximum receiving instant of the last bit of the synchronization word SW. As has been seen, a transmission delay of 50 bits is permitted, and the synchronization word SW occupies the bits B16 to B31 of a time window. Moreover, if tolerances permitted by the DECT standard are taken into account, the instant of arrival of each time window is subjected to an absolute jitter of +/−6 bits. The search for any synchronization words in the time windows of the received frames must thus be effected from bit B10 to bit B88. Alternatively, once a first synchronization word has been detected in a time window, said delay is determined and the location of the synchronization word for the same window in the next frame is known with a precision of +/−3 bits. To avoid any disturbance by interference or noise signals, the search for the synchronization words must thus be limited to a time interval of +/−3 bits around the detection instant of the synchronization word of said window in the preceding frame.

In practice, the estimation of the DC component of the received signal is made by circuit 20a which is a RC low-pass filter formed by a resistor R, a slow capacitor CL and a fast-acting capacitor CR. When the fast-acting capacitor is selected, the circuit 20a estimates the DC component of the received signal, and when the slow capacitor is selected, the estimation may be considered stopped. It is an object of the invention to guarantee that the DC component of the received signal is not estimated upon an interference signal or upon a noise signal. Therefore, this estimation is made during the preamble word P of the synchronization field after which it is stopped for the rest of the time window to avoid any deviation in the case where a long fixed sequence would be transmitted. When the base station is unlocked, the estimation is thus to be made between the bits B474 and B72. Afterwards, after a first synchronization word has been detected in a time window, the estimation must take place only during the preamble word, because the location of the preamble word is supposed to be identical to that of the preamble word of the same window in the preceding frame. In practice, the jitter which may appear during a time window from one frame to the next does not affect the result of the estimation: thus it is not necessary to take this into consideration.

To this effect, the radio base station also comprises a locking automaton 70 for managing the locked or unlocked state of the radio base station and for generating, as a function of this state, a control signal SC50 of the circuit 50 for the detection of the synchronization word, a control signal SC20 for the circuit 20a for the estimation of the DC component of the received signal (the signal makes it possible to select either the slow capacitor or the fast-acting capacitor of circuit 20a), and a pulse SR30 for re-initializing the timing recovery unit 30, which pulse is transmitted when the control signal SC20 for the estimation circuit 20a is triggered.

In the case of packets P80, the search for the synchronization word and the estimation of the DC component of the received signal need only be triggered for time windows that correspond to the beginning of a packet, that is to say, every second time window. Therefore, the frame processing circuit 60 transmits an information bit SP70 to the automaton 70 to indicate thereto that it concerns a packet P32 or P80. The circuit 60 extracts this information from a field A contained in the data field of the received packets.

Figure 4:
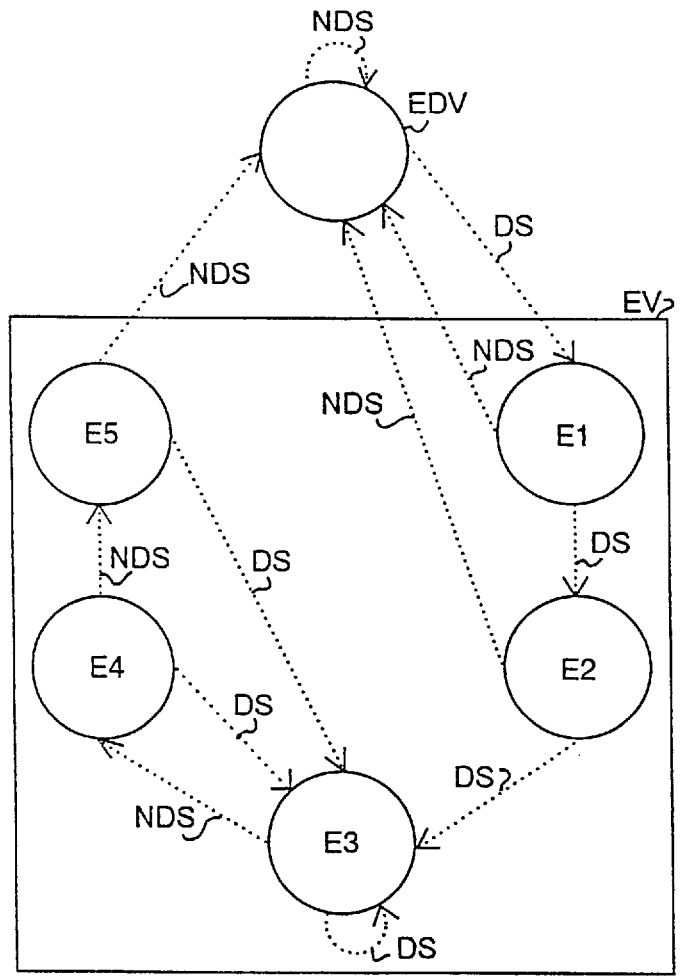
FIG. 4 is a state diagram of an automaton for managing the unlocked or locked state of a radio base station.

The operation of the locking automaton 70 will now be described with reference to the flow chart of FIG. 4. The arrows referenced DS and DSN in this drawing Figure indicate the detection and loss respectively, of the synchronization word SW. The states EDV and EV of the automaton correspond to the unlocked and locked states respectively, of the radio base station. The locked state EV is divided into a locked sub-state E3 and four intermediate sub-states E1, E2, E4 and E5. Starting from the unlocked state EDV, it is necessary to detect the synchronization word SW three times in succession to pass to the locked sub-state E3. Conversely, starting from the locked sub-state E3, it is necessary to lose the synchronization word SW three times in succession to return to the unlocked state EDV. In the state EDV no error is tolerated during the detection of the synchronization word. In the state EV a single error is tolerated, that is to say, that the synchronization word is considered to be detected even if it contains one error bit. It is thus possible to obtain a good comprise between the automaton stability and the transmission quality.

Thus, starting from the state EDV, the automaton changes to a first intermediate sub-state E1 if it detects the synchronization word SW. Then, starting from this first intermediate sub-state it changes to second intermediate sub-state E2 if it recognizes the synchronization word SW. In the opposite case, the automaton returns to the unlocked state EDV. Starting from the intermediate sub-state E2, the automaton changes to the locked substate E3 if it detects the synchronization word SW. In the opposite case, it returns to the unlocked state EDV. The automaton remains in the locked sub-state E3 as long as it detects the synchronization word in the received data. And as soon as it loses a synchronization word, it changes to a third intermediate sub-state E4. Starting from this third intermediate sub-state E4, the automaton returns to the locked sub-state E3 if it detects the synchronization word. On the other hand, if it does not detect this word, it changes to a fourth intermediate sub-state E5. Starting from this fourth intermediate sub-state E5 the automaton returns to the locked sub-state E3 if it detects the synchronization word and changes to the unlocked state EDV if it does not.

Thus, the state $E_{N+1,P}$ of the radio station for the time window P of the $N+1^{th}$ frame is thus function of the state $E_{N,P}$ of said window P of the preceding frame N and of the detection or non-detection of the synchronization word S.

When the time window P is received for the $N^{th}$ time, the state of station $E_{N,P}$ and the instant at which the synchronization word $B_{N,P}$ is detected are written in a memory of the circuit 70 which thus operates in parallel with each of the 24 time windows of a frame. They are used for generating the control signals $SC20_{N+1,P}$ and $SC50_{N+1,P}$ and the re-initializing signal $SR30_{N+1,P}$ of the time window P of the next frame N+1. The state $E_{N,P}$ of the radio station and the instant $B_{N,P}$ at which the synchronization word is detected are written during the time window P of the frame N, after the synchronization word has been received, during a falling edge of the control signal SCM. The state $E_{N,P}$ and the instant $B_{N,P}$ at which the synchronization word is detected are read out at the end of the time window P−1 of the frame N+1, during a rising edge of a control signal SCM.

Figure 5C:
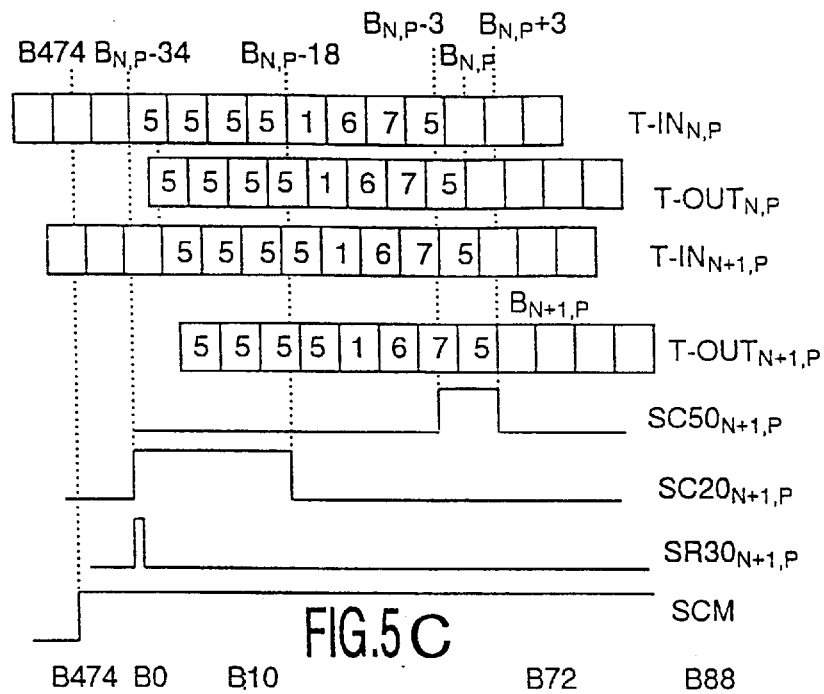
FIGS. 5A–5C represent timing diagrams of the control signals of the circuits used for detecting the synchronization word and estimating the DC component of the received signal.
Figure 5A:
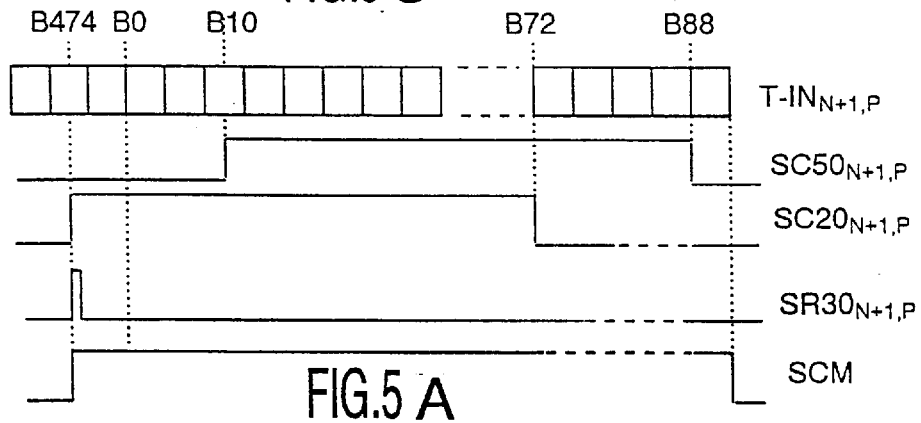
Figure 5B:
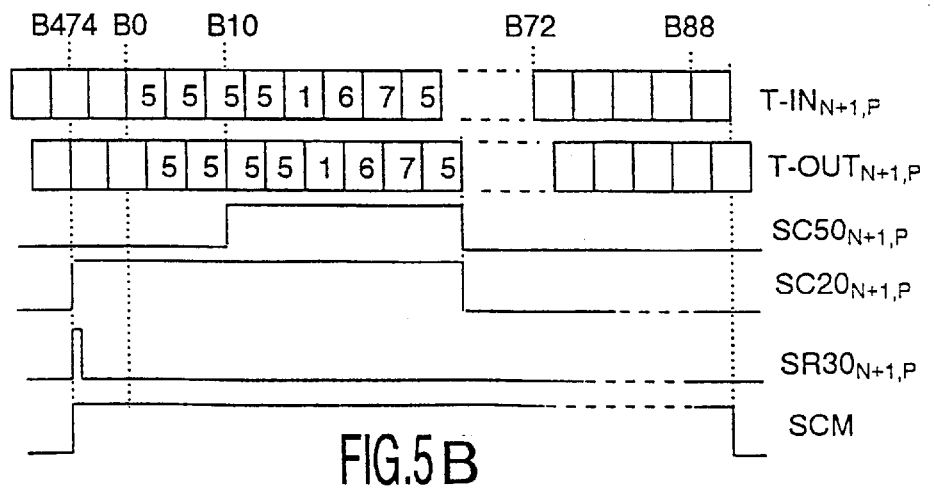

The FIGS. 5B and 5A represent respectively, for packets P32, the signals generated in the state EDV depending on whether or not the synchronization word is detected. FIG. 5C represents, still for P32 packets, the signals generated in the state EV. The time windows $T-IN_{N,P}$ and $T-OUT_{N,P}$ correspond to the $N^{th}$ reception of the $P^{th}$ time window on the input of the radio base station and on the input of the synchronization word detection circuit 50, respectively. The shift of position which appears between these two time windows in the Figure is due to the transit time of the timing recovery unit 30; it is of the order of 2 bits.

According to FIG. 5A, the signal SCM for controlling the reading/writing of state $E_{N,P}$ of the station, and for controlling the instant $B_{N,P}$ at which the synchronization word is detected is activated at bit B474 and deactivated after bit B88. The signal $SC50_{N+1,P}$ for controlling the synchronization word detection circuit is activated at bit B10 and deactivated at bit B88. The signal $SC20_{N+1,P}$ for controlling the estimation circuit is activated at bit B474 and deactivated at bit B72. And, finally, the re-initialization pulse $SR30_{N+1,P}$ of the sampling and timing recovery unit is transmitted at bit B474.

According to FIG. 5B, once the synchronization word has been detected, that is to say, immediately after the last bit of the synchronization word has been received, the control signals $SC20_{N+1,P}$ and $SC50_{N+1,P}$ are deactivated so that the reception is not disturbed until the end of the time window.

According to FIG. 5C, the control signal SCM for controlling the reading and writing of the state of the station is activated at bit B474 and deactivated after bit B88. The control signal $SC50_{N+1,P}$ of the synchronization word detection circuit is activated 3 bits before the detection instant $B_{N,P}$ of the synchronization word of the time window P of the preceding frame N and deactivated 3 bits thereafter. The control signal $SC20_{N+1,P}$ for controlling the estimation circuit is activated at bit $B_{N,P}$-34 and deactivated at bit $B_{N,P}$-18. And, finally, the re-initialization pulse $SR30_{N+1,P}$ for the sampling and timing recovery unit is transmitted at bit B0.

In this FIG. 5C is represented the extreme case where the time window $T-IN_{N+1,P}$ of the $N+1^{th}$ frame is shifted by +3 bits relative to the time window $T-IN_{N,P}$ of the $N^{th}$ frame. In that case the deactivation of the control signal $SC50_{N+1,P}$ of the circuit 50 corresponds to the instant $B_{N+1,P}$ at which the synchronization word is detected in time window $T-OUT_{n+1,P}$.

In practice, the circuits 30, 50 and 70 are formed by programmable logic circuits, for example, an EPM 7128 circuit manufactured by Altera.

The circuit 20a is advantageously provided by means of a 1 kOhm resistor, a slow capacitor CL of 330 nF and a fast-acting capacitor CR of 10 nF. Generally, the selection of the capacitors CL and CR whose values are to have a ratio of the order of 100 is important.

It will be evident that modifications can be made to the embodiment which has just been described, without leaving the scope of the present invention. Notably, the invention is not restricted to the DECT standard, and other time-division multiple access transmission standards can be used which have a preamble and a synchronization word at the beginning of the packet.

I claim:

1. A radio communication system comprising at least one terminal synchronized with a radio station for transmitting radio frames to said radio station which contain information streams among which comprise notably a preamble word (P) and which arrive at said radio station with a delay that is smaller than a certain limit, wherein said radio station comprises an estimation circuit for estimating a DC component of received radio frames, which estimation is used as a decision threshold by said radio station to assign a value to the information streams of the received radio frames, wherein said radio station further comprises means for determining the delay, and control means for controlling said estimation circuit, so that:

(i) as long as the delay is undetermined, the estimation is made during a time interval of which the time interval boundaries, defined on the basis of said certain limit, correspond to the minimum and maximum possible receiving instants of the preamble word, and (ii) when the delay is determined, the estimation is made only during the preamble word.

2. The radio communication system as claimed in claim 1, wherein each radio frame additionally contains a synchronization word (S), the detection by said radio station of which notably makes it particularly possible to determine the delay, and wherein said radio station further comprises control means for controlling a synchronization word detection circuit, so that:

(i) as long as the delay is undetermined, the detection is activated during a time interval of which the time interval boundaries, defined on the basis of said certain limit, correspond to the minimum and maximum instants at which the synchronization word can be received, whereas the detection is deactivated once a synchronization word has been detected, and (ii) when the delay is determined, the detection is activated during a limited time interval around a provided detection position of the synchronization word.

3. The radio communication system as claimed in claim 2, wherein the control means of the estimation circuit make it possible, when the delay is undetermined, to stop the estimation of the DC component of the received radio frames the moment a synchronization word has been detected.

4. The radio communication system as claimed in claim 1, further comprising a system applied to the DECT standard as of Dec. 13, 1993.

5. A radio station which is intended to be used in a radio communication system which comprises at least one terminal synchronized with said radio station for transmitting radio frames to said radio station which contain information streams among which comprise notably a preamble word (P) and which arrive at said radio station with a delay that is smaller than a certain limit, said radio station comprising an estimation circuit for estimating a DC component of received radio frames, which estimation is used as a decision threshold by said radio station to assign a value to the information streams of the received radio frames, wherein said radio station further comprises means for determining the delay, and control means for controlling said estimation circuit, so that:

(i) as long as the delay is undetermined, the estimation is made during a time interval of which the time interval boundaries, defined on the basis of said certain limit, correspond to the minimum and maximum possible receiving instants of the preamble word, and (ii) when the delay is determined, the estimation is made only during the preamble word.

6. The radio station as claimed in claim 5, wherein each radio frame additionally contains a synchronization word (S), the detection by said radio station of which notably makes it possible to determine the delay, said radio station further comprising control means for controlling a synchronization word detection circuit, so that:

(i) as long as the delay is not determined, the detection is activated during a time interval of which the time interval boundaries, defined on the basis of said certain limit, correspond to the minimum and maximum possible receiving instants of the synchronization word, while the detection is deactivated once a synchronization word has been detected, and (ii) when the delay is determined, the detection is activated during a limited time interval around a provided detection position of the synchronization word.

7. The radio station as claimed in claim 6, wherein the estimation circuit control means make it possible, when the delay is undetermined, to stop the estimation of the DC component of the received radio frames the moment a synchronization word has been detected.

8. The radio station as claimed in claim 5, wherein the estimation circuit for estimating the DC component of the received signal is a low-pass filter which includes a capacitor called slow capacitor (CL) and a capacitor called fast-acting capacitor (CR), and wherein the control means make it possible to select the fast-acting capacitor (CR) to make an estimation, and the slow capacitor (CL) to stop the estimation.

9. The radio station as claimed in claim 8, wherein the slow capacitor (CL) and the fast-acting capacitor (CR) have values of which the ratio is of the order of several hundred.

10. The radio station as claimed in claim 5, further comprising a radio station applied to the DECT standard as of Dec. 13, 1995.

\* \* \* \* \*